US012439457B2

(12) United States Patent
Laselva et al.

(10) Patent No.: US 12,439,457 B2
(45) Date of Patent: Oct. 7, 2025

(54) METHODS AND APPARATUSES FOR AVOIDING RADIO LINK CONTROL (RLC) CONTEXT FETCH IN SMALL DATA TRANSMISSION (SDT)

(71) Applicant: NOKIA TECHNOLOGIES OY, Espoo (FI)

(72) Inventors: Daniela Laselva, Klarup (DK); Philippe Godin, Versailles (FR); Subramanya Chandrashekar, Bangalore (IN)

(73) Assignee: NOKIA TECHNOLOGIES OY, Espoo (FI)

(*) Notice: Subject to any disclaimer, the term of this patent is extended or adjusted under 35 U.S.C. 154(b) by 553 days.

(21) Appl. No.: 17/829,605

(22) Filed: Jun. 1, 2022

(65) Prior Publication Data

US 2023/0007701 A1  Jan. 5, 2023

(30) Foreign Application Priority Data

Jun. 30, 2021 (IN) .............................. 202141029448

(51) Int. Cl.
*H04W 74/0833* (2024.01)
*H04W 76/20* (2018.01)
*H04W 76/30* (2018.01)

(52) U.S. Cl.
CPC ....... *H04W 74/0841* (2013.01); *H04W 76/20* (2018.02); *H04W 76/30* (2018.02)

(58) Field of Classification Search
CPC .. H04W 74/0841; H04W 76/20; H04W 76/30
See application file for complete search history.

(56) References Cited

U.S. PATENT DOCUMENTS 10,750,559 B2 *  8/2020  Chun ................ H04W 28/0247
10,791,508 B2 *  9/2020  Park ..................... H04W 48/18
(Continued)

FOREIGN PATENT DOCUMENTS

| WO | 2020/189958 A1 | 9/2020 | |
|---|---|---|---|
| WO | 2020/191059 A1 | 9/2020 | |
| WO | WO-2021163394 A1 * | 8/2021 | ........ H04W 36/0033 |

OTHER PUBLICATIONS

Huawei: "Support of RACH based small data transmission", 3GPP Draft; R3-210139, 3rd Generation Partnership Project (3GPP), Mobile Competence Centre; 650, Route Des Lucioles; F-06921 Sophia-Antipolis Cedex ; France vol. RAN WG3, No. E-meeting; Jan. 25, 2021-Feb. 5, 2021 Jan. 15, 2021 (Jan. 15, 2021).

(Continued)

*Primary Examiner* — Tejis Daya
(74) *Attorney, Agent, or Firm* — SQUIRE PATTON BOGGS (US) LLP

(57) ABSTRACT

Systems, methods, apparatuses, and computer program products for improved signaling of small data transmission (SDT) are provided. One method may include storing, at a first target network node, a user equipment (UE)-specific uplink (UL) small data transmission (SDT) context for a user equipment (UE) in a non-connected radio resource control (RRC) state that previously had initiated a small data transmission (SDT) procedure without anchor relocation via the first target network node or a second target network node. The method may also include performing radio link control (RLC) processing of the radio link control (RLC) protocol data units (PDUs) received from the user equipment (UE) using the stored user equipment (UE)-specific uplink (UL) small data transmission (SDT) context.

17 Claims, 14 Drawing Sheets

(56) References Cited

U.S. PATENT DOCUMENTS

| | | | |
|---|---|---|---|
| 11,012,915 B2* | 5/2021 | Hampel | H04L 47/263 |
| 11,330,663 B2* | 5/2022 | Park | H04W 76/38 |
| 11,621,762 B2* | 4/2023 | Cirik | H04W 72/1263 |
| | | | 370/329 |
| 11,695,821 B2* | 7/2023 | Sabella | G06F 9/5072 |
| | | | 709/226 |
| 11,943,743 B2* | 3/2024 | Park | H04W 68/025 |
| 2020/0053791 A1 | 2/2020 | Ozturk et al. | |
| 2020/0137564 A1 | 4/2020 | Liu et al. | |
| 2022/0039198 A1* | 2/2022 | Liu | H04W 76/22 |
| 2022/0046580 A1* | 2/2022 | Park | H04W 68/02 |
| 2022/0124555 A1* | 4/2022 | Godin | H04L 12/4633 |
| 2022/0248493 A1* | 8/2022 | Kim | H04W 36/0033 |

OTHER PUBLICATIONS

Nokia: "Small Data Transmission Enhancements for Rel-18", 3GPP Draft; RWS-210080, 3rd Generation Partnership Project (3GPP), Mobile Competence Centre ; 650, Route Des Lucioles ; F-06921 Sophia-Antipolis Cedex; France No. Jun. 28, 2021-Jul. 2, 2021; Jun. 7, 2021 (Jun. 7, 2021).

Extended European Search Report dated Nov. 7, 2022, corresponding to European Patent Application No. 22174995.5.

3GPP TR 22.824 V16.0.0 (Sep. 2018), Technical Report, 3rd Generation Partnership Project; Technical Specification Group Services and System Aspects; Feasibility study on 5G message service for MIoT; Stage 1 (Release 16), Sep. 2018.

3GPP TR 22.891 V14.2.0 (Sep. 2016), Technical Report, 3rd Generation Partnership Project; Technical Specification Group Services and System Aspects; Feasibility Study on New Services and Markets Technology Enablers; Stage 1 (Release 14), Sep. 2016.

3GPP TS 33.501 V17.1.0 (Mar. 2021), Technical Specification, 3rd Generation Partnership Project; Technical Specification Group Services and System Aspects; Security architecture and procedures for 5G system (Release 17), Mar. 2021.

3GPP TS 38.300 V15.12.0 (Mar. 2021), Technical Specification, 3rd Generation Partnership Project; Technical Specification Group Radio Access Network; NR; NR and NG-RAN Overall Description; Stage 2 (Release 15), Mar. 2021.

Ericsson, "Summary of email discussion [Post111-e][926][SmallData] Context Fetch," R2-20xxxxx, 3GPP TSG-RAN WG2 Meeting #112-e, E-meeting, 2020.

Qualcomm Incorporated, "RACH based uplink small data transmission with or without anchor relocation," R2-2007541, 3GPP TSG-RAN WG2 Meeting #111e, Online, Aug. 17-28, 2020.

Qualcomm Incorporated, "Discussion on RACH based NR small data transmission," R2-2101231, 3GPP TSG-RAN WG2 Meeting #113e, Online, Jan. 25-Feb. 5, 2020.

ZTE Corporation, "Work Item on NR smalldata transmissions in INACTIVE state," RP-201305, 3GPP TSG RAN Meeting #88e, eMeeting, Jun. 29-Jul. 3, 2020.

\* cited by examiner

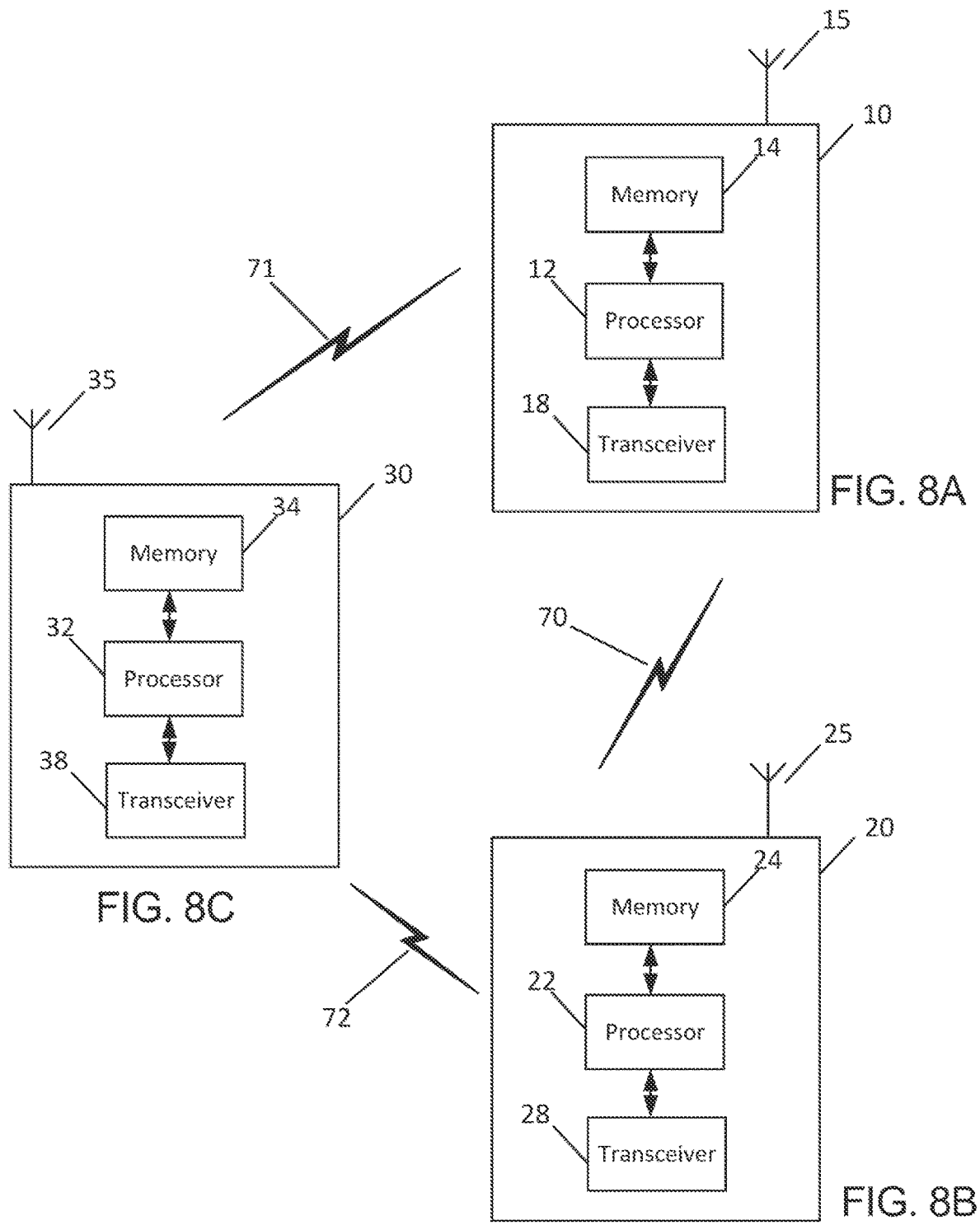

METHODS AND APPARATUSES FOR AVOIDING RADIO LINK CONTROL (RLC) CONTEXT FETCH IN SMALL DATA TRANSMISSION (SDT)

CROSS REFERENCE TO RELATED APPLICATIONS

This application claims priority from IN Provisional Application No. 202141029448, filed on Jun. 30, 2021. The entire contents of this earlier filed application are hereby incorporated by reference in their entirety.

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for improved signaling of small data transmission (SDT).

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS

For proper understanding of example embodiments, reference should be made to the accompanying drawings, wherein:

FIG. 8A illustrates an example block diagram of an apparatus, according to an example embodiment;

FIG. 8B illustrates an example block diagram of an apparatus, according to an embodiment; and FIG. 8C illustrates an example block diagram of an apparatus, according to an example embodiment.

SUMMARY

Figure 1A:
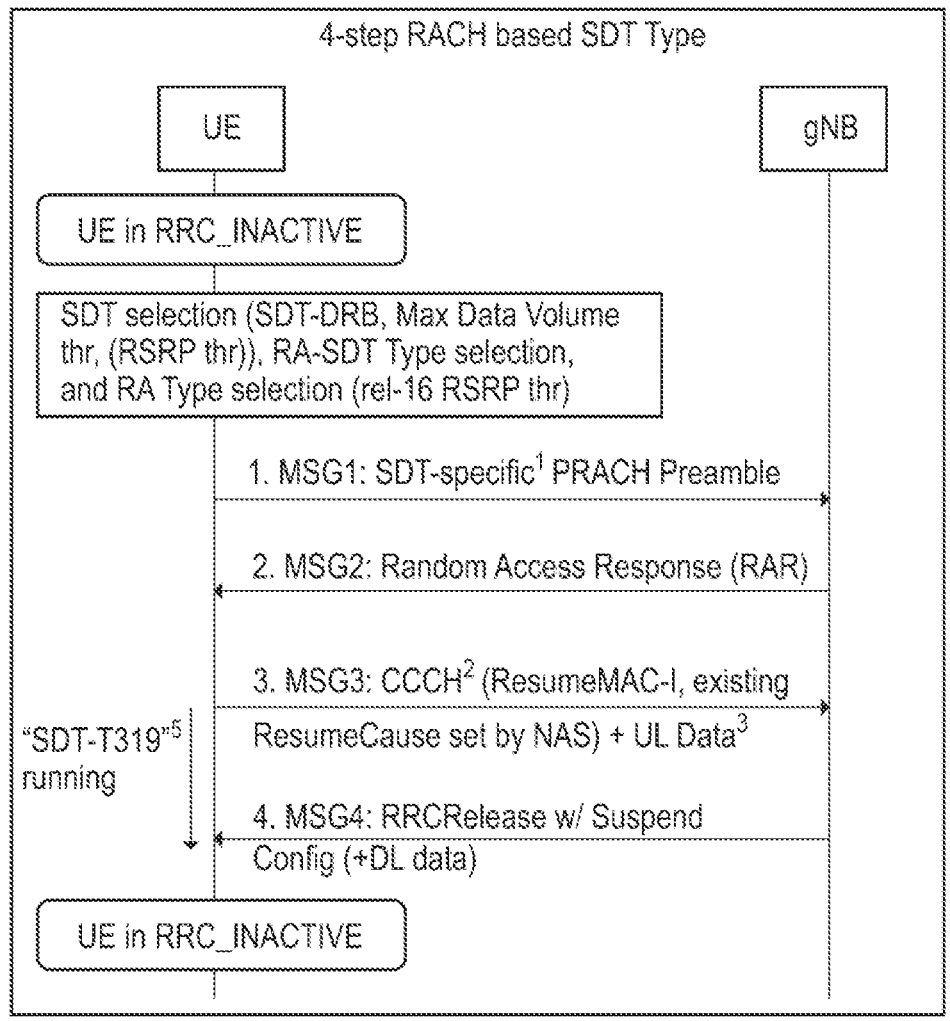
FIG. 1A illustrates an example of the 4-step RACH based SDT type, according to an embodiment.

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide a method comprising: storing, at a first network node, a user equipment-specific uplink small data transmission context for a user equipment in a non-connected radio resource control state, wherein the first network node previously had initiated a small data transmission procedure without anchor relocation via the first network node or a second network node.

In a further aspect thereof the exemplary embodiments of this invention provide an apparatus comprising: at least one processor; and at least one memory comprising computer program code, the at least one memory and computer program code configured, with the at least one processor, to cause the apparatus at least to: store, at the apparatus, a user equipment-specific uplink small data transmission context for a user equipment in a non-connected radio resource control state, wherein the apparatus previously had initiated a small data transmission procedure without anchor relocation via the apparatus or another network node.

In another aspect thereof the exemplary embodiments of this invention provide an apparatus comprising: at least one processor; and at least one memory comprising computer program code, the at least one memory and computer program code configured, with the at least one processor, to cause the apparatus at least to: store, at the apparatus, a user equipment-specific downlink small data transmission context for a user equipment in non-connected radio resource control state that is initiating small data transmission procedure to a target network node; and allocate one or more uplink tunnel endpoint identifiers for small data transmission procedures without anchor relocation.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for improved signaling of small data transmission (SDT), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

As will be discussed in detail below, certain example embodiments provide enhancements that enable UEs in the radio resource control (RRC) inactive state of 5G NR to perform small data transmission (SDT) in a more backhaul signaling efficient manner.

Currently, small and infrequent data transfers that are needed by a UE is in the RRC_INACTIVE state entail that an RRC connection resume is to be made to switch the UE to the RRC connected state, where the small data can be transferred, and then a subsequent suspension of the connection back to the RRC_INACTIVE state will likely occur immediately after the data transfer. This may happen for each and every data transmission, resulting in unnecessary UE power consumption and signaling overhead as well as increased packet latency. However, the NR system has requirements to be efficient and flexible for low throughput short data bursts (e.g. See 3GPP TS 22.891) and to support efficient signalling mechanisms (e.g., signalling is less than payload), and reducing the signalling overhead in general.

Therefore, in 3GPP Release 17, consideration is being given to address the inefficiencies explained above (i.e., signalling overhead and delay associated with state transition from RRC_INACTIVE to RRC_CONNECTED to perform a short data transmission). The SDT functionality is important, since a motivation to introduce the RRC_INACTIVE state itself in NR was to be able to transition UEs with infrequent data transmission to a state with minimum signalling overhead and minimum power consumption. The current objectives for enabling SDT in the RRC inactive state include, for UL SDTs for random access channel (RACH)-based schemes (i.e., 2-step and 4-step RACH): identifying a general procedure to enable UP data transmission for small data packets from INACTIVE state (e.g., using MSGA or MSG3), enabling flexible payload sizes larger than the Release 16 common control channel (CCCH) message size that is currently possible for inactive state for MSGA and MSG3 to support user plane (UP) data transmission in uplink (UL), and enabling context fetch and data forwarding (with and without anchor relocation) in inactive state for RACH-based solutions. For transmission of UL data on pre-configured physical uplink shared channel (PUSCH) shared resources (i.e., reusing the configured grant type 1) when timing advance (TA) is valid, the objectives include identifying a general procedure for SDT over configured grant type 1 resources from inactive state, enabling configuration of the configured grant type 1 resources for SDT in UL for inactive state.

According to the above-noted objectives, three SDT types are being defined as discussed in the following. A UE in RRC_Inactive can transmit UL data as part of the random access, i.e., "RA-SDT". For instance, RA-SDT may include "4-step RA-SDT" and/or "2-step RA-SDT". In 4-step RA-SDT, the Msg3 (PUSCH) of the 4-step random access procedure is used to transmit the SDT payload. In 2-step RA SDT, the MsgA (PUSCH) of the 2-step random access procedure is used to transmit the SDT payload. Certain conditions may be defined for the UE to check before being allowed to use a RA-SDT type, such as: the payload should belong to a data radio bearer (DRB)/signaling radio bearer (SRB) allowed for SDT; the data volume should be below a defined data volume threshold; the (cell) Reference Signal Received Power (RSRP) should be above a threshold; and/or a legacy RSRP based condition may apply to select between 2-step and 4-step RACH SDT.

A UE in RRC_Inactive can transmit UL data on pre-configured PUSCH resources, "CG-SDT". In this case, configured grant (CG) type 1 based PUSCH resources can be used by the UE to transmit the SDT payload, i.e., without a random access procedure, when the UE has a valid timing advance (TA) and other conditions are met. The conditions for CG-SDT may include TA validity conditions and/or further conditions that may be checked before the UE is allowed to use the assigned CG resources. With respect to the TA validity conditions, before using a CG-SDT resource, the UE has to ensure that its last received TA is valid by checking, e.g., that the TA timer (TAT) is running, if a TAT was received, and that the defined TA validity condition(s) are also valid. The latter may be based on an RSRP variation to be compared to RSRP variation thresholds, e.g., similar to the LTE preconfigured UL resources (PUR) based early data transmission (EDT). In addition to the TA validity condition(s) above, further conditions may be defined to be checked before UE is allowed to use the assigned CG resources, such as a combination of the following: the payload should belong to a DRB/SRB allowed for SDT; the data volume should be below a defined data volume threshold; the UE should be in the last serving cell that assigned the resources; the CG resources should be valid; and/or the SS-RSRP of the beam selected for the SDT transmission via a CG based PUSCH resource should be above a defined RSRP threshold.

It is noted that in case any of these validation conditions defined for CG-SDT are not met, CG-SDT cannot be used and the UE can fall back to use RA-SDT (i.e., 4-step RA-SDT type or 2-step RA-SDT type, according to the specifications/configuration and validity/selection conditions defined for those SDT types).

Figure 1B:
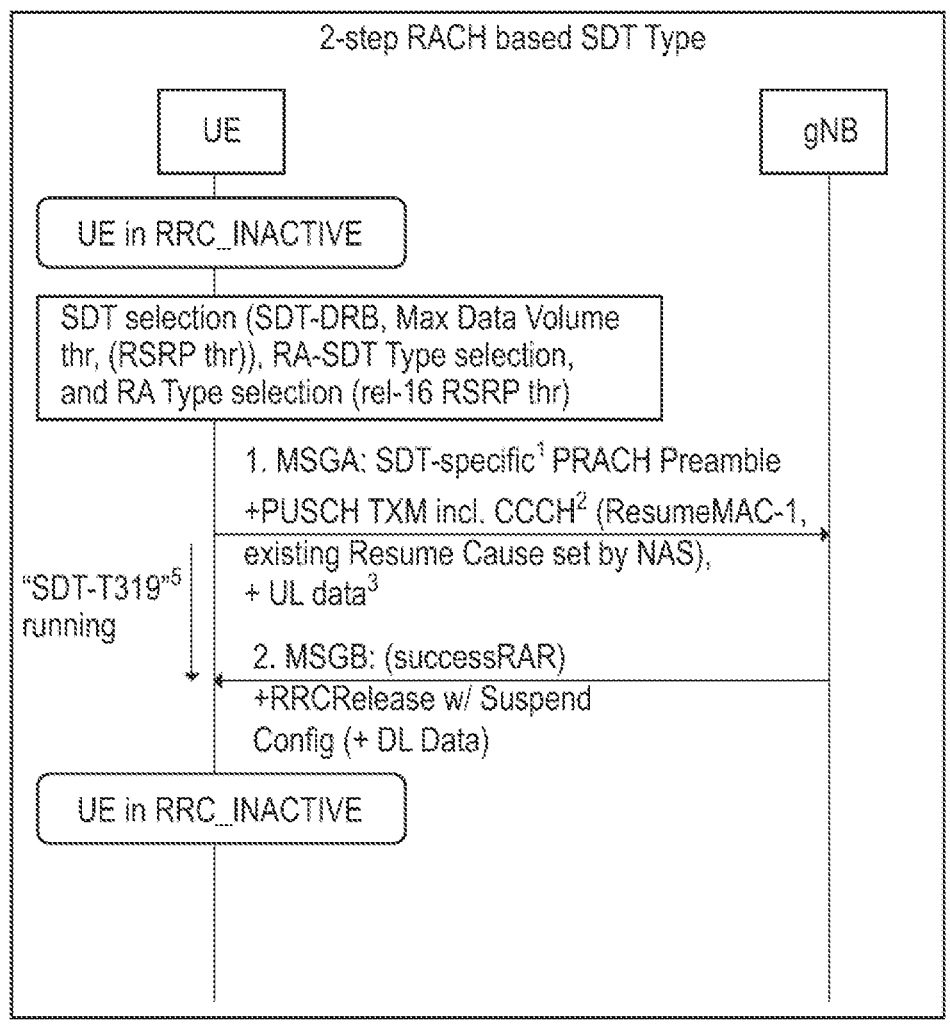
FIG. 1B illustrates an example of the 2-step RACH based SDT type, according to an embodiment.
Figure 1C:
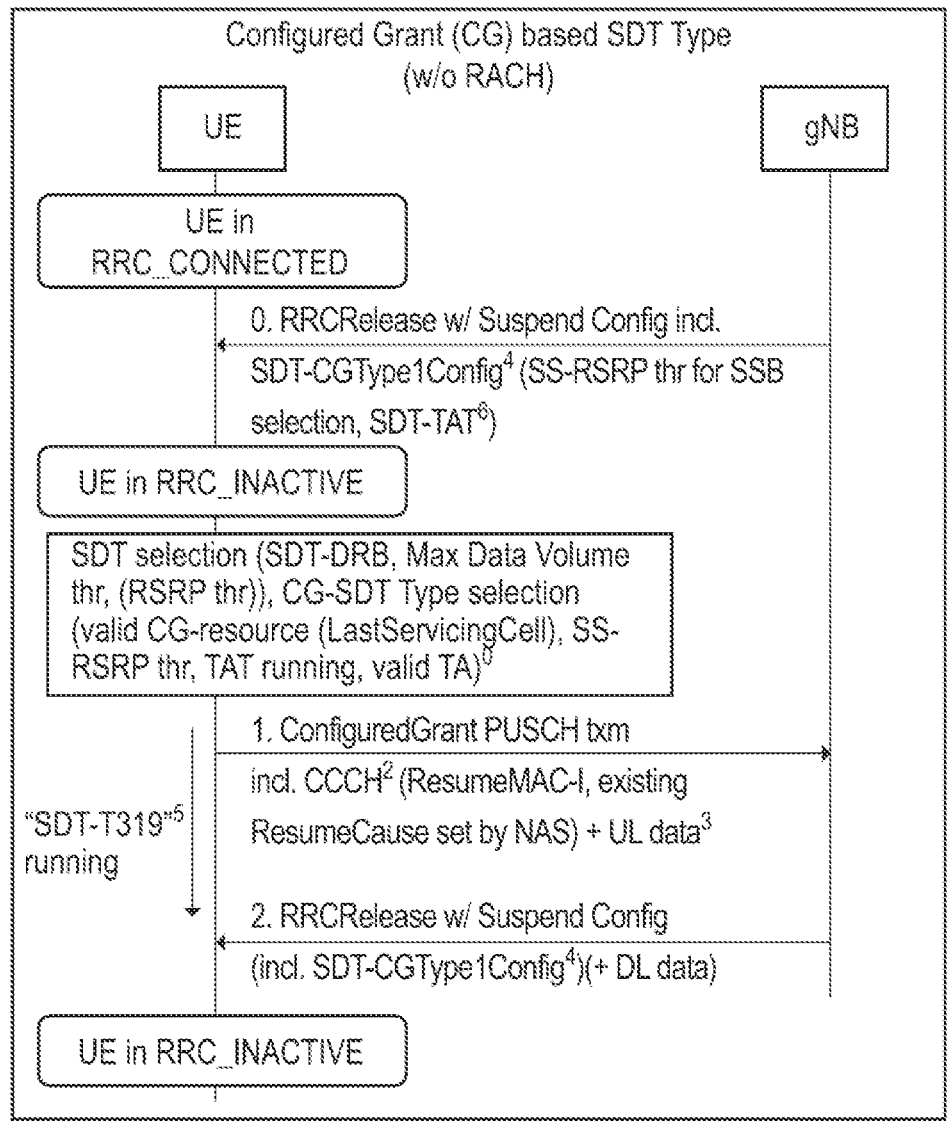
FIG. 1C illustrates an example of the CG based SDT type (without RACH), according to an embodiment.

FIGS. 1A, 1B, and 1C illustrate examples of the three SDT types discussed above for the single-shot SDT case, i.e., an SDT procedure that includes only one UL data and in addition only one DL data (optionally). In particular, FIG. 1A illustrates an example of the 4-step RACH based SDT type, FIG. 1B illustrates an example of the 2-step RACH based SDT type, and FIG. 1C illustrates an example of the CG based SDT type (without RACH).

It has been agreed that "multi-shot" SDT, i.e., an SDT procedure that includes multiple subsequent UL/DL SDT transmissions (without transitioning to RRC_CONNECTED), will be supported. In other words, when a UE is in RRC_INACTIVE, it should be possible to send multiple UL and DL packets as part of the same SDT mechanism and without transitioning to RRC_CONNECTED on dedicated grant.

Specific examples of small and infrequent data traffic that would benefit from the SDT procedure may include at least use cases relating to smanphone applications as well as non-smanphone applications. For instance, smartphone applications may include traffic from instant messaging services, heart-beat/keep-alive traffic from IM/email clients and other apps, and/or push notifications from various applications. Non-smanphone applications may include, for example, traffic from wearables (periodic positioning information, etc.), sensors (Industrial Wireless Sensor Networks transmitting temperature, pressure readings periodically or in an event triggered manner, etc.), and/or smart meters and smart meter networks sending periodic meter readings.

Figure 2:
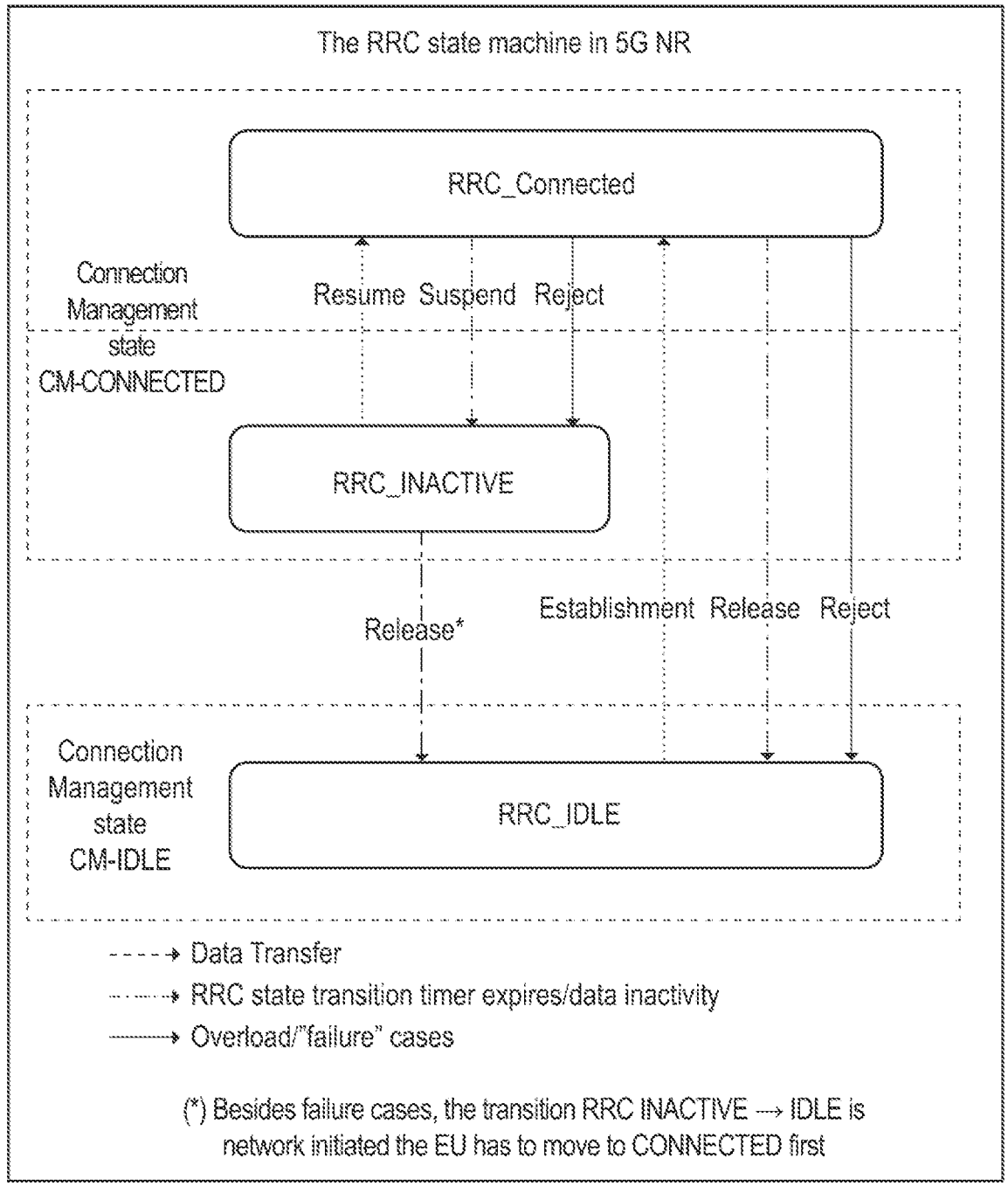
FIG. 2 illustrates an example of the NR RRC state machinery, according to an embodiment.

A new independent RRC state, referred to as RRC_INACTIVE, was introduced in 3GPP NR Release 15 complementing the existing states, RRC_CONNECTED and RRC_IDLE, with the goal of lean signalling and energy-efficient support of NR services. Although the design was conceived particularly for mMTC/MIoT services (e.g., See 3GPP TR 22.824), it could be beneficial to efficiently deliver small/infrequent traffic of eMBB and URLLC services as well. FIG. 2 illustrates an example of the NR RRC state machinery. As illustrated in the example of FIG. 2, the RRC_INACTIVE state enables to more quickly resume an earlier suspended connection and start the transmission of small or sporadic data with a much lower initial access delay and associated signalling overhead as compared to the RRC_IDLE state. This is achieved mainly due to reduced control signalling required for requesting and obtaining the resume of a suspended RRC connection, which results in UE power saving. At the same time, a UE in RRC_INACTIVE is able to achieve similar power savings as in RRC_IDLE, benefiting from, e.g., a much larger period of PDCCH monitoring (e.g., for paging) and relaxed measurements compared to RRC_CONNECTED.

Furthermore, compared to keeping the UE in RRC_CONNECTED, the new state minimizes mobility signalling both to RAN (e.g., RRC measurement reporting, handover messages) and to the core network (e.g., to/from the AMF) as the UE can move transparently to the RAN within a network defined set of cells (RAN notification area, RNA). The transition from RRC_CONNECTED to RRC_INACTIVE, is triggered by the gNB with the transmission of a RRC Release message that includes the suspend configuration information, which includes I-RNTI, RAN-Paging-Cycle, RAN-NotificationAreaInfo and timer t380 (that refers to the timer that controls when the periodic RNA Update (RNAU) procedure should occur at the UE).

It is noted that, when a UE is moved to RRC_INACTIVE, the UE Access Stratum (AS) context (referred to as UE Inactive AS Context), necessary for the quick resume of the suspended connection, is maintained both at the UE side and RAN side (at the last serving gNB, aka Anchor gNB), and it is identified at the network side by the UE identifier, i.e., Inactive-RNTI (I-RNTI).

Both SDT solutions with and without anchor relocation are in scope for RA-SDT (context fetch and data forwarding with and without anchor relocation in INACTIVE state for RACH-based solutions), and will be defined in Release 17. It is noted that the decision on whether to perform anchor relocation is up to the network and is transparent to the UE. The working assumption is that the decision is up to the anchor gNB based on assistance information received from the target gNB. The content of such assistance information is still to be decided; however, it could comprise indication of whether the UE has further data to transmit in addition to the payload(s) included in the initial UL SDT transmission.

In SDT with anchor relocation, the target gNB initiates both the UE AS context fetch from the anchor gNB (last serving gNB) and the path switch procedure. After both procedures are complete, the PDCP processing of the UL data received from the UE can take place at the target gNB and the UL data can be forwarded to the UPF. This may be similar to the legacy procedure of RRC connection resume.

In SDT without anchor relocation, the target gNB initiates the UE AS context fetch from the anchor gNB (last serving gNB) but the anchor gNB responds with, e.g., a "Retrieve Context Failure". That is, the anchor gNB does not provide the UE AS Context and keeps storing it; also, no path switch takes place, which is beneficial to avoid the heavy associated signalling. This may be similar to the legacy procedure of RNA update without context relocation.

Figure 3:
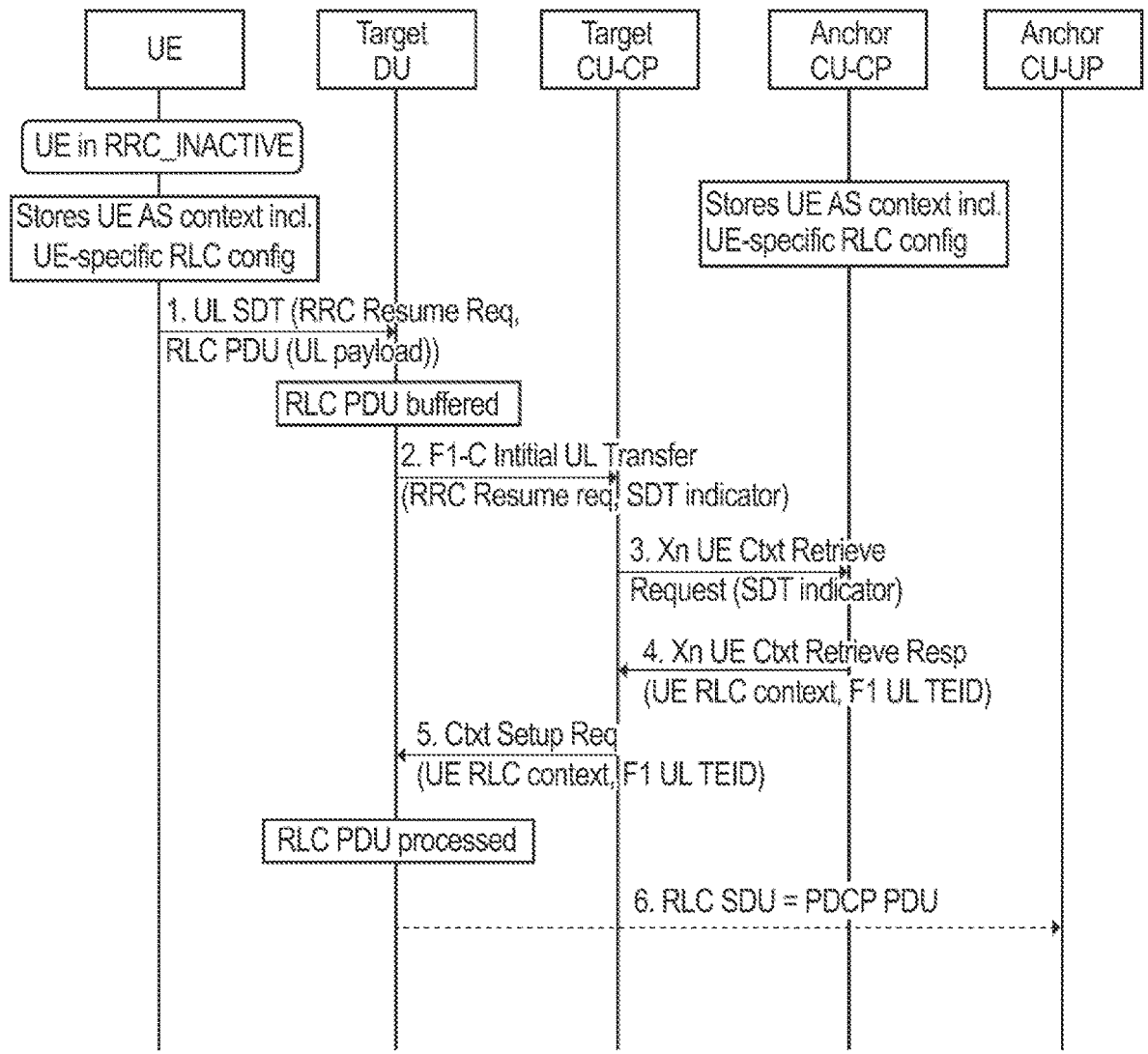
FIG. 3 illustrates an example signaling diagram for SDT without anchor relocation, according to an embodiment.

FIG. 3 illustrates an example of a signaling diagram for SDT without anchor relocation. The signalling of SDT without anchor relocation is not optimized in Release 17. Particularly, the use of a UE-specific RLC context has been agreed for SDT in Release 17. This implies the need for backhaul signalling to fetch the RLC configuration of the UE from the anchor gNB (CU-CP in disaggregated RAN architectures), which may be necessary to process, at the target gNB, the RLC PDU received from the UE. It is noted that such RLC configuration retrieval may be needed even though the UE AS context remains at the anchor gNB (CU-CP), i.e., no context nor anchor relocation takes place in SDT without relocation, as explained above. This results in increased backhaul signaling as shown in the example of FIG. 3.

As will be discussed in detail herein, certain example embodiments include methods that make the signalling of SDT without anchor relocation leaner by avoiding the need for RLC context fetch by a target gNB at least for a "returning UE". In an embodiment, a "returning UE" may be defined as a UE that initiates multiple SDT procedures in the same target gNB. In the context of certain embodiments, it may be assumed that each SDT procedure is without anchor relocation to save path switch signalling between RAN and access and mobility management function (AMF). The "returning UE" scenario can be quite likely, for example, for most smartphone UEs, as a smartphone can be served by the same gNB (e.g., the gNB providing coverage to the end-user home, office, etc.) for an extended period of time (e.g., hours), during which the UE can perform many SDT procedures to transmit small data from smartphone applications (e.g., APP notifications).

In one embodiment, UE-specific UL SDT context may be stored at a previous target node, e.g., target DU/CU-CP, for SDT with UL data. For example, a target gNB (e.g., target CU-CP and/or DU) may store certain UE-specific UL SDT context for a UE in RRC inactive state that previously had initiated an SDT procedure without anchor relocation to the same target DU. According to some embodiments, the stored UE-specific UL SDT context may include at least certain information, which was previously fetched from the anchor gNB (anchor CU-CP) by the target CU-CP via the Xn interface (e.g. triggered by a previous SDT procedure of the UE). For instance, the information included in the stored UE-specific UL SDT context may include one or more of UE-specific RLC context for SDT, F1 UL Tunnel Endpoint Identifiers (TEIDs) associated with the anchor node CU UP of the UE's DRB, and/or UE identifier (e.g. I-RNTI). The UE-specific RLC context for SDT can allow the target DU to be able to immediately perform the RLC processing of the RLC PDU(s) received from a "returning UE" (i.e., a UE that initiates a second, third, and so forth SDT procedure in the same target DU). It is noted that UE-specific RLC context for SDT includes part or the entire RLC configuration stored in the UE AS Context, to be used for UL SDT transmissions, which comprises the RLC mode per SDT-LCH/DRB (e.g., Acknowledged Mode, AM, or Unacknowledged Mode, UM), and the RLC sequence number (SN) length per SDT-LCH/DRB. The F1 UL TEIDs associated to the anchor node CU UP of the UE's DRBs may allow the target DU to be able to immediately forward the UL RLC SDU received from the UE (after RLC processing) to the anchor CU-UP (where PDCP processing and forwarding to UPF can then take place). The UE identifier (e.g., I-RNTI) can allow for identifying the UE initiating an SDT procedure as a "returning UE". Any cell of the target DU can then leverage the stored UE-specific UL SDT context when the UE initiates a new SDT procedure towards any of these cells.

Some example embodiments may include maintaining UE-specific SDT UL context in synchronization in previous gNBs. Further, the anchor gNB may be responsible for updating the UE-specific UL SDT context to any previous target DU of same gNB or different previous gNB when needed, via target CU-CP. For example, an anchor gNB can trigger the update of the UE identifier (e.g., I-RNTI) in any previous target DU or target gNB upon the UE completing a new SDT procedure. Alternatively, the anchor gNB can trigger the discard of the UE-specific UL SDT context at the previous target DU or target gNB, e.g., if the UE resumes the RRC connection. Alternatively, or additionally, the target DU or target gNB can apply a timer-based approach to discard a stored UE-specific UL SDT context. It is noted that at least the I-RNTI may have to be updated after a SDT procedure.

According to a further embodiment, a proactive transfer of UE-specific UL SDT context to potential target DUs/CU-CPs without previous SDT for "SDT with UL data scenario" may be performed. For example, after the first SDT procedure to a target gNB, the target CU-CP may send, to the DUs of the target gNB, the stored UE-specific UL SDT context pro-actively, so that any future SDT procedure to any DU can benefit from the stored UE-specific UL SDT context. It is noted that the UE-specific RLC context contains static information, and also the F1 UL TEID is static for the UE's DRB. Similarly, after receiving an update of the I-RNTI from the anchor CU-CP, the target CU-CP may update its DUs with the updated I-RNTI corresponding to the stored UE-specific UL SDT context.

In another aspect, the anchor CU-CP may send pro-actively to some or all neighbor CU-CPs the stored UE SDT context, so that any future SDT procedure to any neighbor gNB can benefit from the stored UE-specific UL SDT context. In case of an update of the I-RNTI, the anchor gNB may send the updated I-RNTI to the involved neighbor gNBs.

In some aspects, the proactive transfer of the UE-specific UL SDT context may be made based on a combination of the estimate/knowledge that the UE will be returning in a target DU/CU-CP, e.g., based on the history of UE mobility, and/or the estimate/knowledge that the UE's SDT procedure include more than a certain number of user plane/control plane data packets to transmit and/or receive. For example, no proactive transfer may be done for single-payload SDT scenarios.

Alternatively, in an embodiment, the anchor CU-CP can store the relevant information from the UE AS context or the entire UE AS context in the RAN database (e.g., using a service based architecture solution). The target CU-CP and/or target DU may retrieve the updated information from the RAN database, e.g., upon notification of a change. This will minimize the Xn signaling load at the anchor CU-CP, removing the need for the anchor CU-CP to provide Xn-based updates to all target gNBs.

According to a further embodiment, UE-specific DL SDT context may be stored at anchor CU-UP for SDT with DL data. For example, the anchor CU-UP may store a certain UE-specific SDT DL context for a UE in RRC inactive state that previously had initiated an SDT procedure to the same target DU. The stored UE-specific DL SDT context at CU-UP may include at least certain information, which was previously received from the target DU (through target CU-CP and anchor CU-CP, via the F1/Xn interface, e.g., triggered by a previous SDT procedure of the UE to the same target DU). For instance, the information included in the stored UE-specific DL SDT context may include F1 DL TEIDs of the UE's DRBs at target DU. This allows the anchor CU-UP to be able to immediately forward the DL RLC SDU pending for the UE DRB to the target DU.

According to yet a further embodiment, proactive transfer of UE-specific SDT DL context to anchor CU-UP for "SDT with DL data scenario" may be performed. This may be similar to the proactive transfer of UE-specific SDT UL context discussed above, with the difference that the UE-specific SDT context is a DL context, which is transferred to anchor CU-UP and that may include the F1 DL TEID of potential DUs of a previous target node.

Figure 4A:
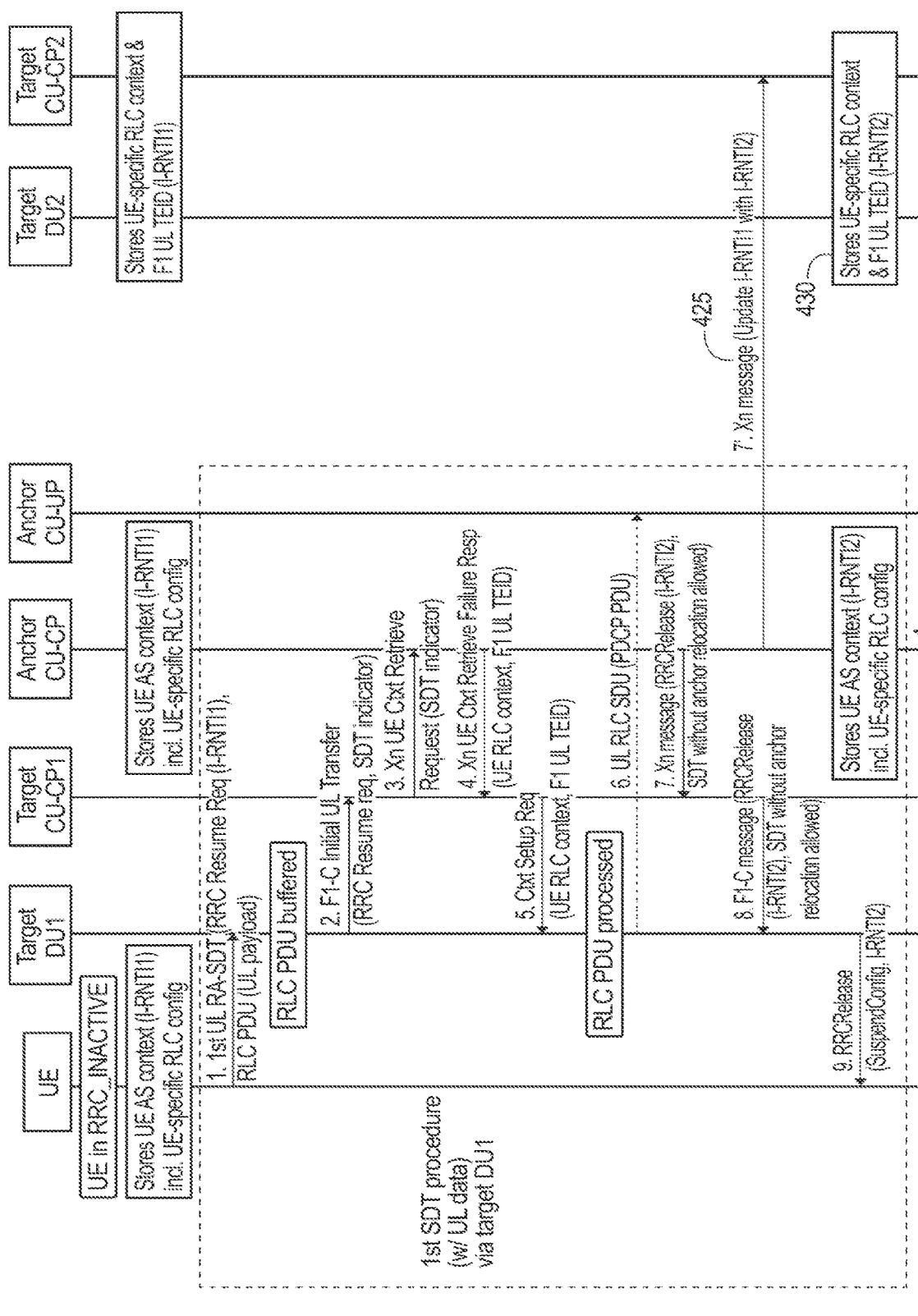
FIG. 4A, FIG. 4B, and FIG. 4C illustrate an example signaling diagram depicting an example of SDT without anchor relocation and with just uplink (UL) data, according to an example embodiment.
Figure 4B:
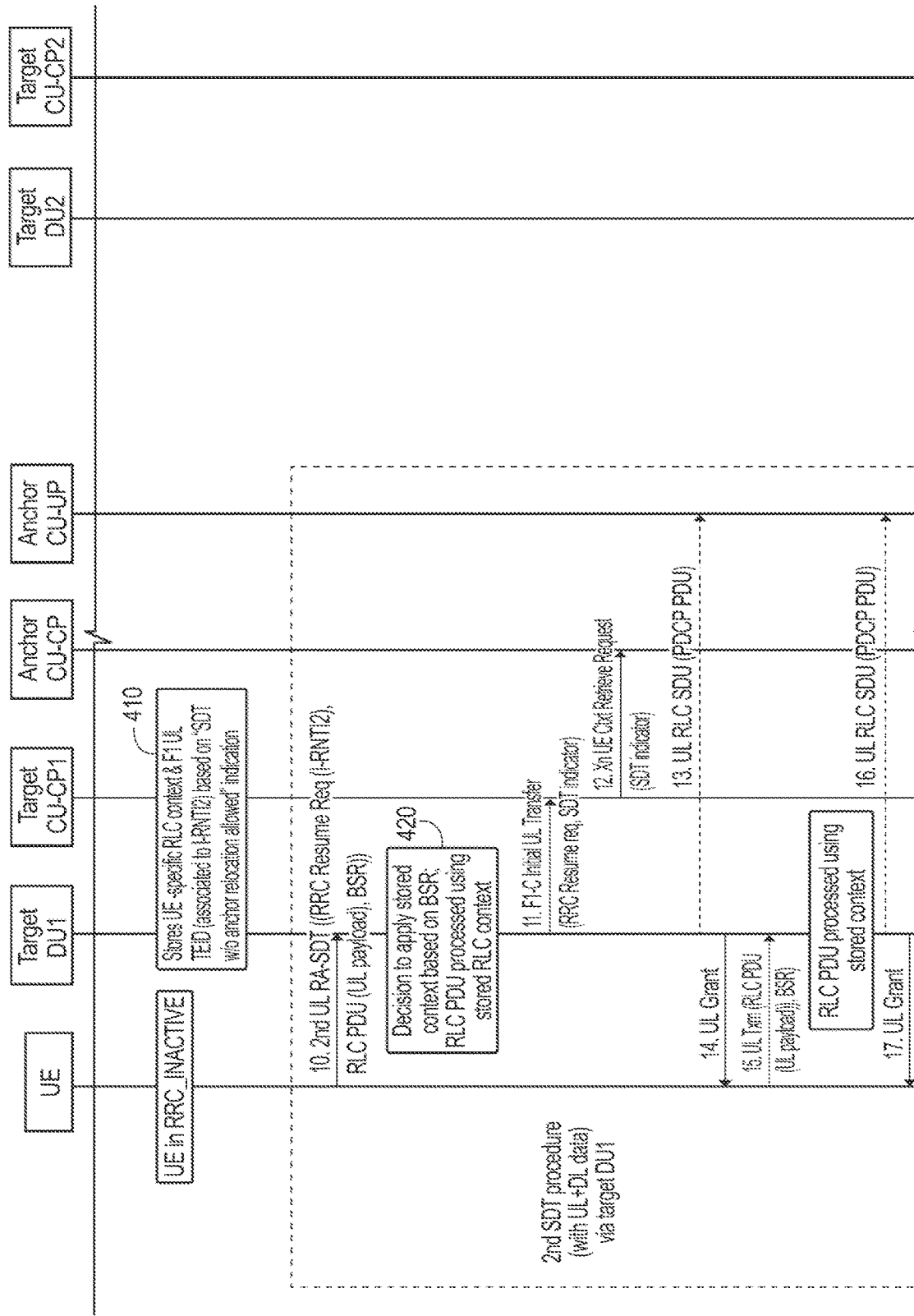
Figure 4C:
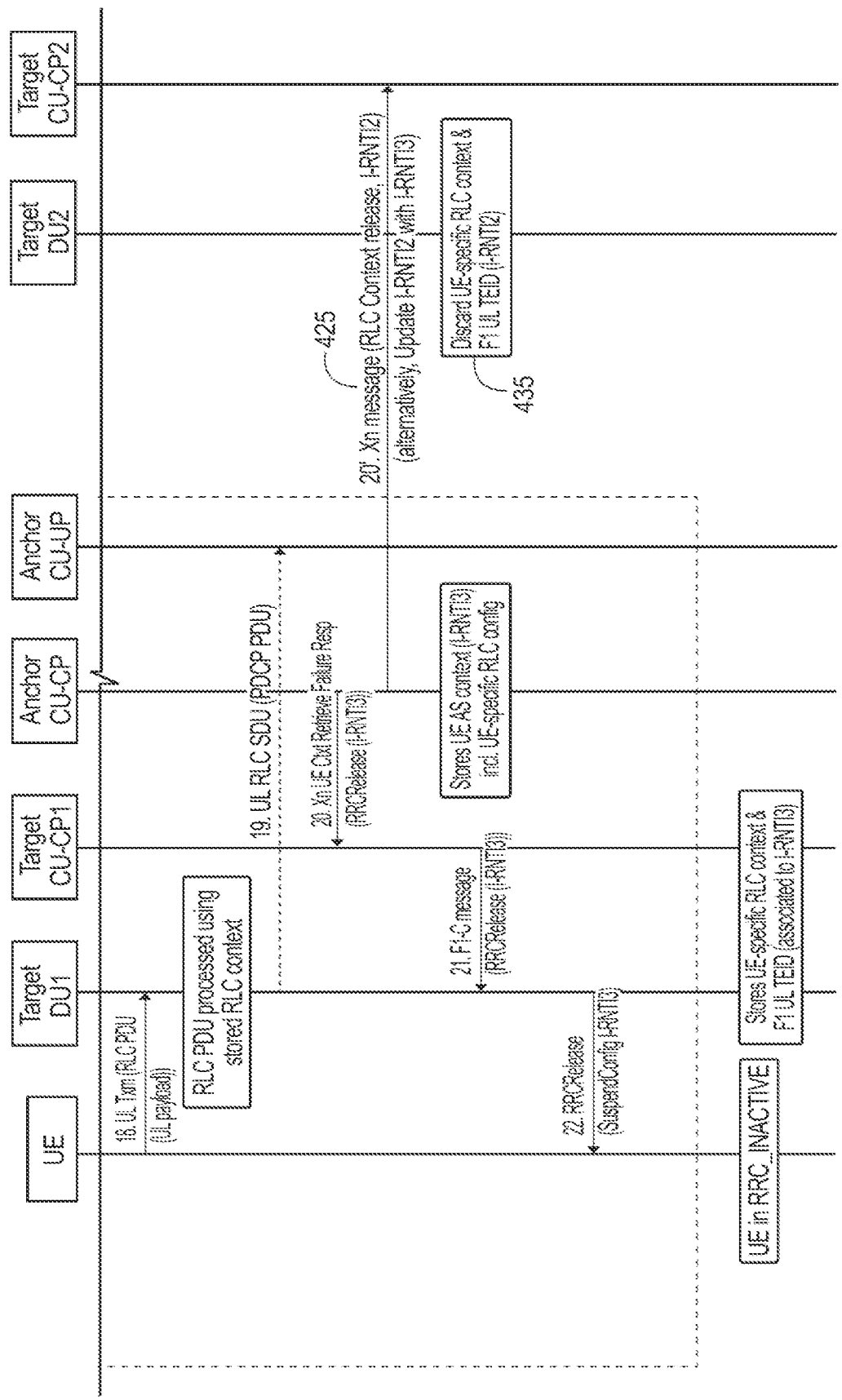

FIG. 4A, FIG. 4B, and FIG. 4C illustrate an example signaling diagram depicting an example of SDT without anchor relocation and with just UL data, according to an example embodiment. In the example of FIG. 4A, the UE-specific UL SDT context may be stored at a previous target node or gNB, e.g., at the target DU/CU-CP, for SDT with UL data.

More specifically, in the example of FIG. 4B, as shown at 410, the target DU (e.g., target DU1) may store the UE-specific UL SDT context after a previous SDT procedure of the UE in the same DU for "SDT without relocation and with UL data". In an embodiment, the stored UE-specific UL SDT context may include I-RNTI, UE-specific RLC context, and/or F1 UL TEID of the anchor CU UP. In the example of FIG. 4A, it is assumed and illustrated that the target DU stores the UE-specific UL SDT context previously fetched. However, alternatively, the target CU-CP (e.g., target CU-CP1) may store the UE-specific UL SDT context and could provide it to the target DU in a new additional F1 message (e.g., F1: UE context Setup procedure), after receiving the F1-C Initial UL Transfer (e.g., as reply to step 11, which is not shown in the figure). As further illustrated in the example of FIG. 4B, at 420, the target DU (e.g., target DU1) may decide whether to apply the stored context based on BSR, and process RLC PDU using stored RLC context.

According to some embodiments, an anchor CU-CP may be configured to ensure that the UE-specific UL SDT context is synchronized in previous target gNBs (e.g., previous target DUs/CU-CPs). For example, the anchor CU-CP may store the target gNBs that performed SDT without anchor relocation (note that these may be just in the UE's RNA). As illustrated in the example of FIG. 4C at 425, the anchor CU-CP may transmit a new Xn message, to one or more of the stored target gNBs (e.g., to a target DU and/or target CU-CP), to update any part of the UE-specific UL SDT context, such as the UE identifier (e.g., I-RNTI). In an embodiment, the target DU and/or target CU-CP may, at 430, store the UE-specific UL SDT context and updated UE identifier. For example, in one embodiment, the target CU-CP may store all of the DUs of target gNB towards which the UE performed SDT without anchor relocation previously and will update their UE-specific UL SDT context as received from the anchor CU-CP. Further, in an embodiment, the target DU and/or target CU-CP may, at 435, discard the stored UE-specific UL SDT context when needed, e.g., when the UE resumes the RRC connection.

It is noted that, in the example of FIG. 4A, it may be assumed that the UE had earlier performed an SDT to target DU2, and thus target DU2 is storing the UE-specific UL SDT context. In contrast, target DU1 may store the UE-specific UL SDT context after the $1^{st}$ SDT procedure of the UE to target DU1 has been completed (e.g., as shown in step 8 in the example of FIG. 4A). Alternatively, the target DU1 could also store it pro-actively as outlined above.

In some embodiments, assistance information may be provided from the anchor CU-CP to target DU/CU-CP on whether the UE-specific UL SDT context should be stored and applied by target DU. For example, according to an embodiment, an anchor CU-CP can provide assistance information to target DU/target CU-CP indicating whether the target DU is allowed to store the UE-specific UL SDT context, and/or indicating under which conditions or rules the target DU is allowed to use or apply the stored UE-specific UL SDT context. According to certain embodiments, the assistance information can be provided by the anchor CU-CP, e.g., as a reply to the Xn Context Retrieve Request from the target CU-CP or in the Xn message providing the RRC Release (e.g., see step 7 in the example of FIG. 4A and similar step 7 of FIG. 5A) in the form of "SDT without anchor relocation allowed" indication. That is, the indication may be present (set to true) if the SDT without anchor relocation is suitable for the UE also in future SDT procedures; otherwise, such a field or information may not be present (or present with a "not true" value). Such an indication allows to avoid violation of the current working assumption that it is up to the anchor CU-CP to determine whether anchor relocation should be performed or not.

According to some embodiments, as part of this assistance information, the conditions/rules on whether the target DU is allowed to use the stored UE-specific UL SDT context (when the UE initiates an SDT procedure to the target DU) can include one or more BSR thresholds. For example, if a UE includes a BSR in its initial UL SDT transmission, which indicates a data amount<BSR thr1, then the target DU should not use or apply the immediate RLC processing of the received RLC PDUs based on the stored UE-specific UL SDT context (e.g., without contacting the anchor gNB CU-CP before). This is because in this scenario, the gain of using this method may be limited. In another example, if a UE includes a BSR in its initial UL SDT transmission, which indicates a data amount>BSR thr2 (BSR thr2>thr1), then the target DU may be allowed to use or apply the immediate RLC processing of the received RLC PDUs based on the stored UE-specific UL SDT context (e.g., without contacting the anchor gNB CU-CP before). This is because in this scenario, the gain of using this method is greater.

Figure 5A:
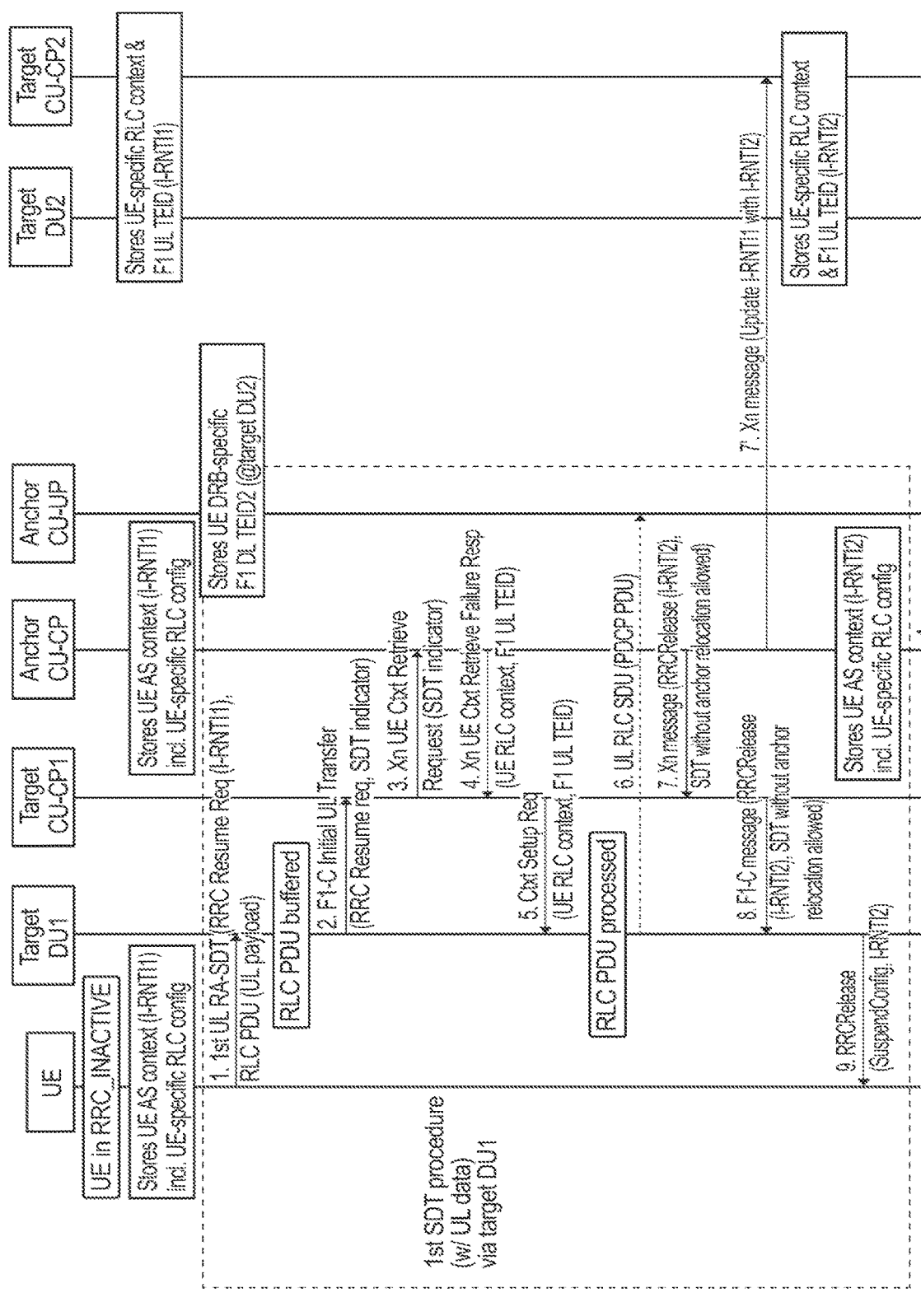
FIG. 5A, FIG. 5B, and FIG. 5C illustrate another example signaling diagram depicting the storing of UE-specific DL SDT context at anchor CU-UP for SDT with DL data, according to an example embodiment.
Figure 5B:
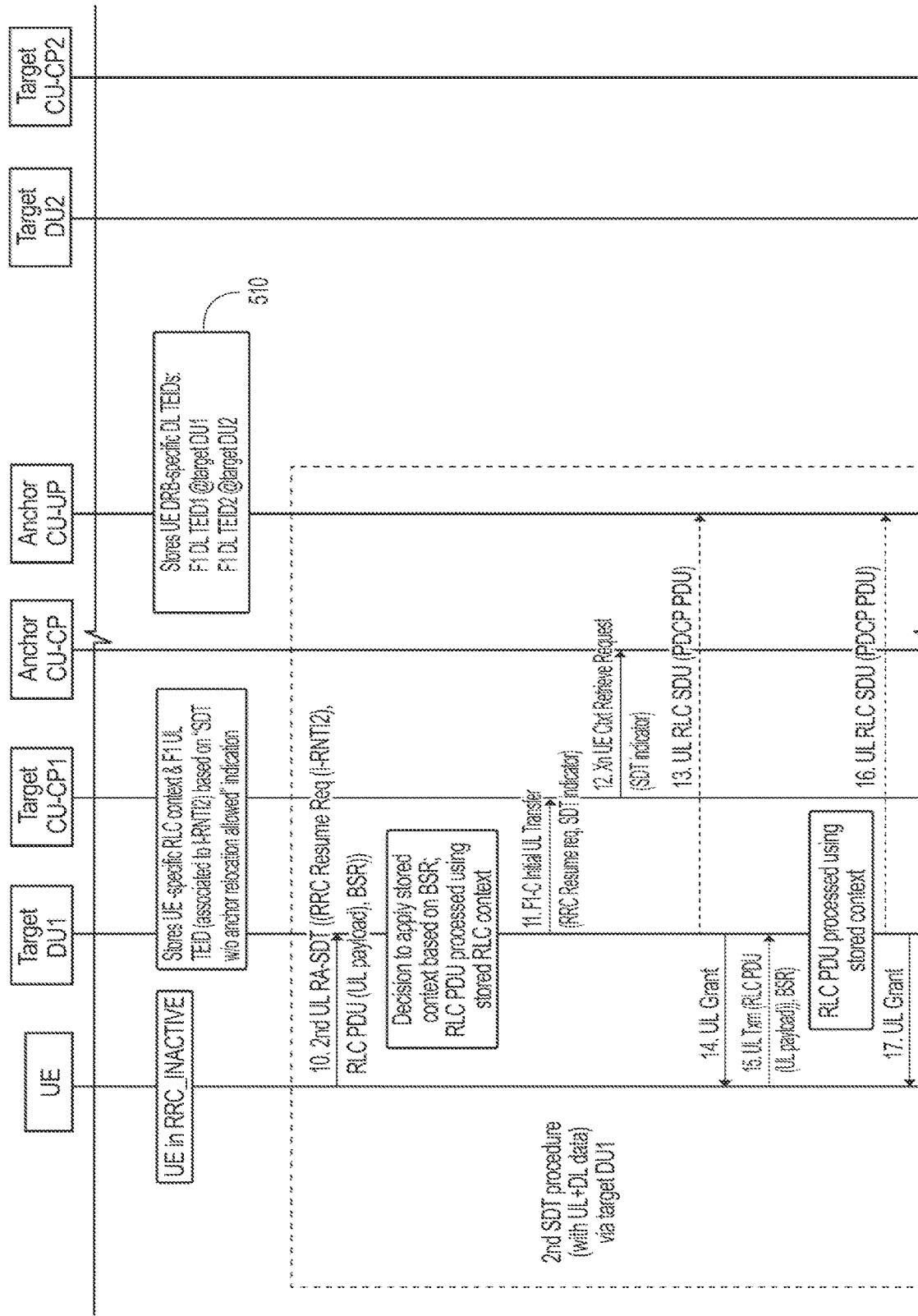
Figure 5C:
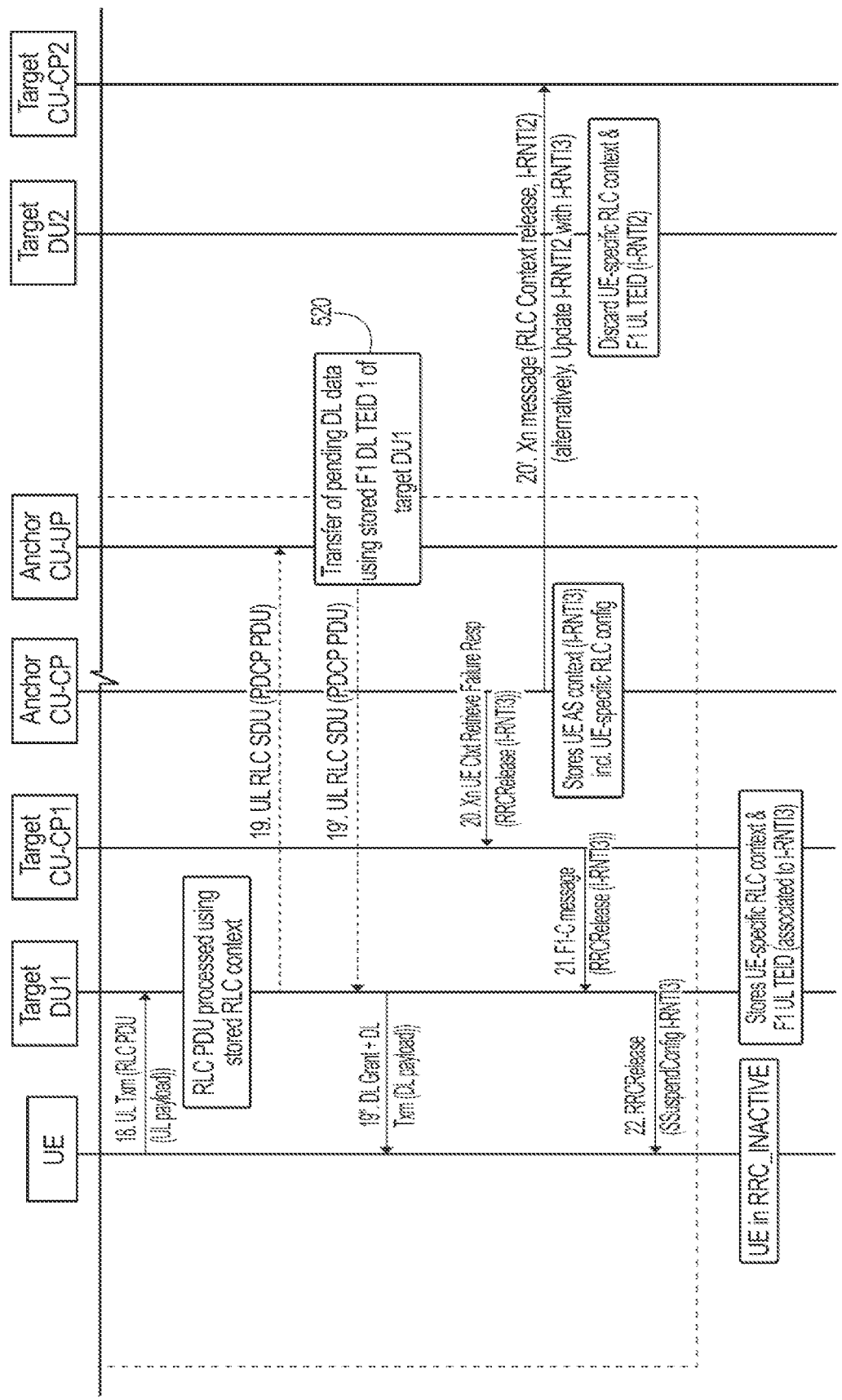

FIG. 5A, FIG. 5B, and FIG. 5C illustrate another example signaling diagram depicting the storing of UE-specific DL SDT context at anchor CU-UP for SDT with DL data, in addition to the storing of UE-specific UL SDT context at previous target DU/CU-CP for SDT with UL data, according to an example embodiment. It is noted that some of the procedures illustrated in the example of FIG. 5A, FIG. 5B, and FIG. 5C may be similar or correspond to procedures illustrated in the example of FIG. 4A, FIG. 4B, and FIG. 4C discussed above.

As illustrated in the example of FIG. 5B, at 510, the anchor CU-UP may store at least the DL target DU address (i.e., F1 DL TEID of the target DU) based on a previous SDT procedure in the same target DU. Then, in the presence of DL data pending at the anchor CU-UP for a returning UE, the anchor CU-UP can transmit the DL data, at 520, to the same target DU immediately upon receiving UL data for the UE from the same target DU. For example, the anchor CU-UP may send pending DL data to target DU1 after step 13 in the example of FIG. 5B. In one embodiment, the anchor CU UP identifies the UE context containing the DL SDT context through the F1 UL TEID with which it received the uplink data at step 13. In an additional aspect, the anchor CU-CP may be configured to update and/or discard the stored UE-specific DL SDT context also in the anchor CU-UP when needed.

Figure 6:
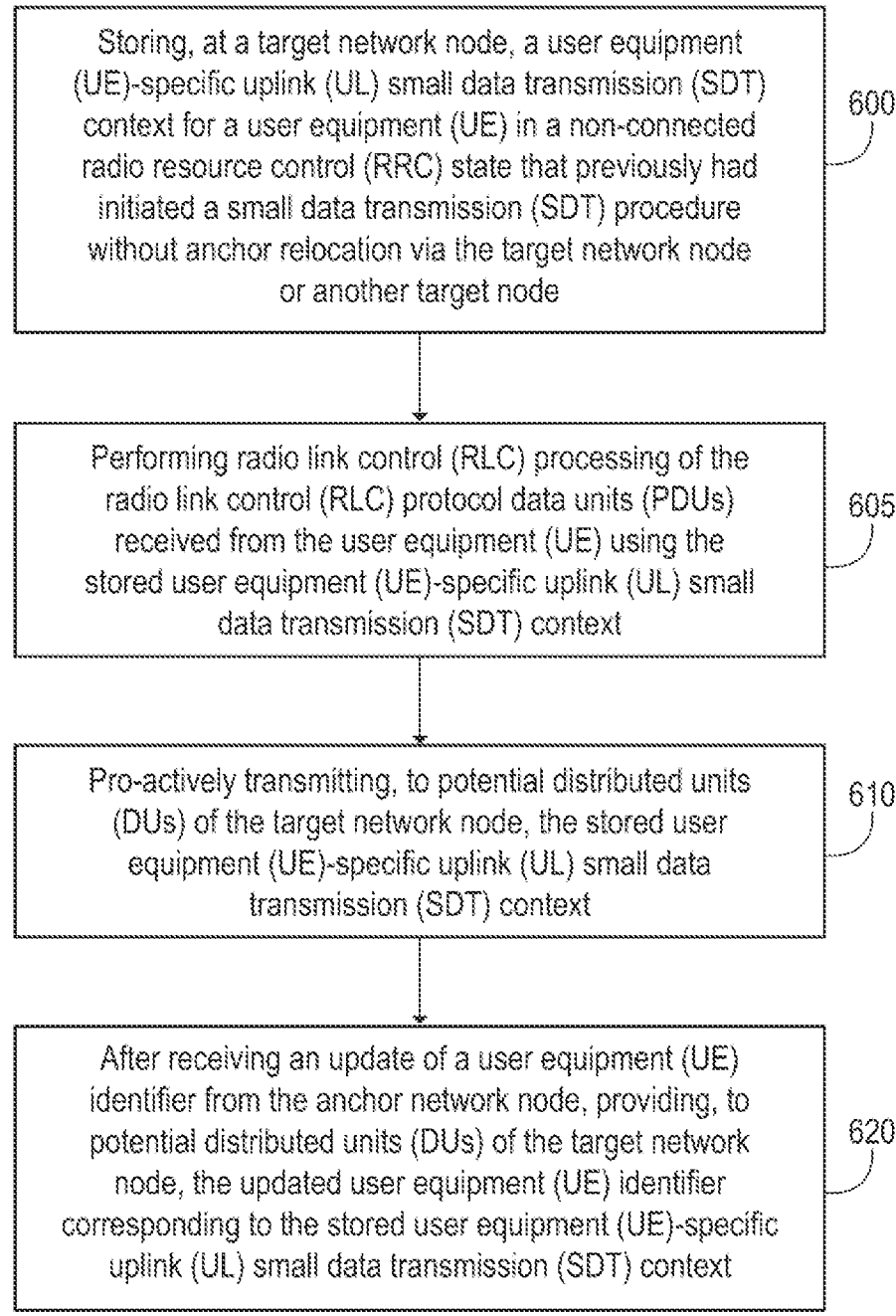
FIG. 6 illustrates an example flow diagram of a method, according to one example embodiment.

FIG. 6 illustrates an example flow diagram of a method for improved signaling of SDT, according to an example embodiment. In certain example embodiments, the flow diagram of FIG. 6 may be performed by a network entity or network node in a communications system, such as LTE or 5G NR. In some example embodiments, the network entity performing the method of FIG. 6 may include or be included in a base station, access node, node B, eNB, gNB, NG-RAN node, transmission-reception points (TRPs), high altitude platform stations (HAPS), relay station or the like. In one embodiment, the network node performing the method of FIG. 6 may include a target network node, target gNB, or target cell, such as one or more of the target DUs and/or target CU-CPs illustrated in the example of FIG. 4A, FIG. 4B, and FIG. 4C or FIG. 5A, FIG. 5B, and FIG. 5C, or similar radio node. Therefore, the method of FIG. 6 may include one or more operations illustrated in the examples of FIG. 4A, FIG. 4B, and FIG. 4C or FIG. 5A, FIG. 5B, and FIG. 5C.

As illustrated in the example of FIG. 6, the method may include, at 600, storing, at a first target network node, a user equipment (UE)-specific uplink (UL) small data transmission (SDT) context for a user equipment (UE) in a non-connected radio resource control (RRC) state that previously had initiated a small data transmission (SDT) procedure without anchor relocation via the first target network node or another target network node. For example, the non-connected RRC state may include RRC inactive state and/or idle state. In one embodiment, the storing 600 may include storing the user equipment (UE)-specific uplink (UL) small data transmission (SDT) context in at least one of a distributed unit or centralized unit control plane (CU-CP) of the target node. For example, the stored user equipment (UE)-specific uplink (UL) small data transmission (SDT) context comprises information that was previously received from an anchor network node by the first target network node. In an embodiment, the information in the stored user equipment (UE)-specific uplink (UL) small data transmission (SDT) context may include one or more of UE-specific radio link control (RLC) context for small data transmission (SDT), F1 uplink (UL) tunnel endpoint identifiers (TEIDs) associated with CU-UP of the user equipment's (UE's) data radio bearer (DRB) of the anchor CU UP, and/or user equipment (UE) identifier (e.g., I-RNTI). More specifically, in one embodiment, the information in the stored user equipment (UE)-specific uplink (UL) small data transmission (SDT) context may include information of at least UE-specific context of a lower layer of the RAN protocol, where the lower layer includes, for example, RLC and PHY. In a further example embodiment, the information in the stored user equipment (UE)-specific uplink (UL) small data transmission (SDT) context may include information of an UL user plane network interface TEIDs, such as F1 uplink TEIDs of the anchor CU UP.

As further illustrated in the example of FIG. 6, the method may include, at 605, performing, at the first target network node, radio link control (RLC) processing of the radio link control (RLC) protocol data units (PDUs) received from the user equipment (UE) using the stored user equipment (UE)-specific uplink (UL) small data transmission (SDT) context. In an embodiment, the method may include forwarding an uplink (UL) radio link control (RLC) service data unit (SDU) received from the user equipment (UE) after the radio link control (RLC) processing to the anchor network node. According to some embodiments, the method may include receiving, from the anchor network node, an update to the user equipment (UE)-specific uplink (UL) small data transmission (SDT) context at a DU or CU-CP of the target network node. In certain embodiments, the method may include receiving, from the anchor network node, a trigger to discard the user equipment (UE)-specific uplink (UL) small data transmission (SDT) context. In another embodiment, the method may include determining to discard the stored user equipment (UE)-specific uplink (UL) small data transmission (SDT) context based on a timer, e.g., based on the expiration of the timer.

As also illustrated in the example of FIG. 6, after a first small data transmission (SDT) procedure via the first target network node or another target node, the method may include at 610, pro-actively transmitting, to potential distributed units (DUs) of the first target network node, the stored user equipment (UE)-specific uplink (UL) small data transmission (SDT) context. In one example, the pro-actively transmitting 610 may include pro-actively transmitting the stored user equipment (UE)-specific uplink (UL) small data transmission (SDT) context based on at least one of: an estimate that the user equipment (UE) will be returning in in the target network node based on a history of the user equipment (UE) mobility, and/or an estimate that the user equipment's (UE's) small data transmission (SDT) procedure include more than a certain number of user plane or control plane data packets to transmit or receive.

According to an embodiment, the method may include, at 620, after receiving an update of a user equipment (UE) identifier from the anchor network node, providing, to potential distributed units (DUs) of the first target network node, the updated user equipment (UE) identifier corresponding to the stored user equipment (UE)-specific uplink (UL) small data transmission (SDT) context. In one embodiment, the method may include retrieving, by the first target network node, relevant information for the stored user equipment (UE)-specific uplink (UL) small data transmission (SDT) context from a radio access network (RAN) database when the first target network node is notified of a change. According to certain embodiments, the method may include receiving assistance information from the anchor network node. For instance, the assistance information may include an indication of whether the target network node is allowed to store the user equipment (UE)-specific uplink (UL) small data transmission (SDT) context, an indication of under which conditions the target network node is allowed to use or apply the stored user equipment (UE)-specific uplink (UL) small data transmission (SDT) context, and/or an indication of estimated UE mobility.

In certain embodiments, the method may also include storing, at the CU-CP of the first target network node, the stored user equipment (UE)-specific uplink (UL) small data transmission (SDT) context and transferring it to the DU of the first target network node upon initiation of a new small data transmission (SDT) procedure via the DU.

Figure 7:
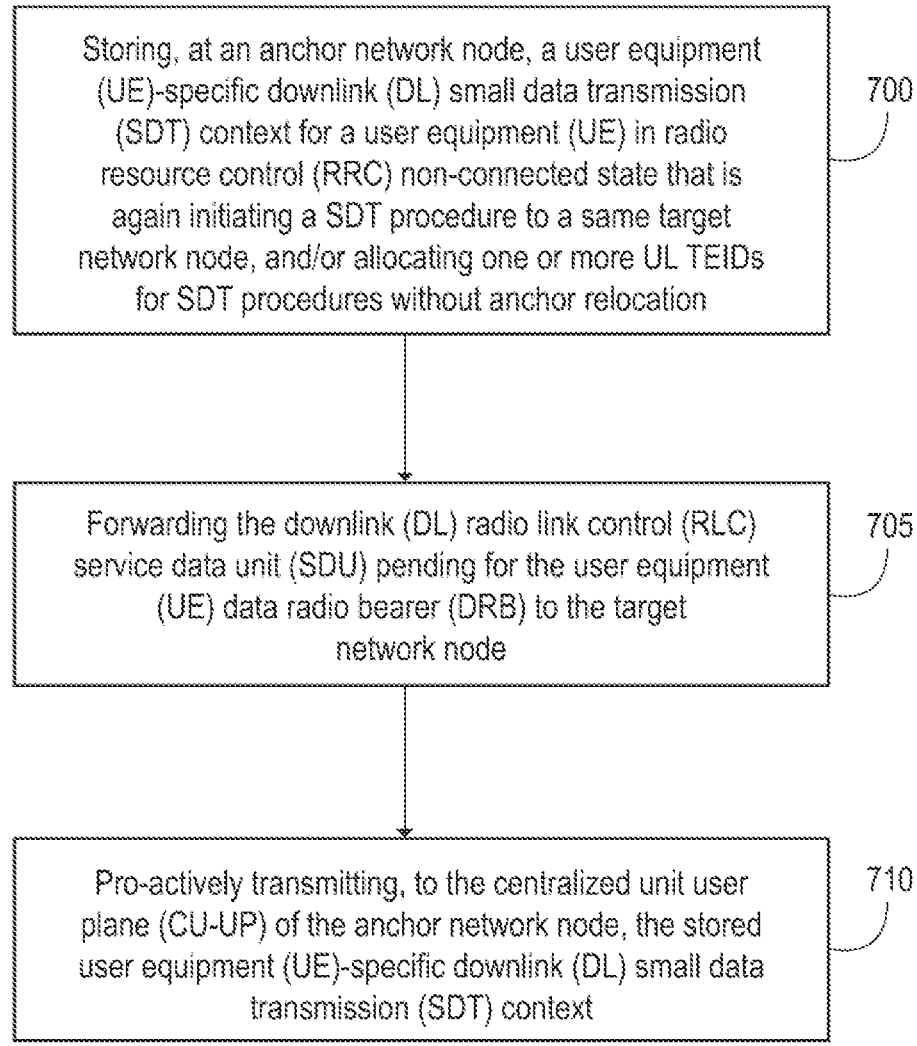
FIG. 7 illustrates an example flow diagram of a method, according to an example embodiment.

FIG. 7 illustrates an example flow diagram of a method for improved signaling of SDT, according to an example embodiment. In certain example embodiments, the flow diagram of FIG. 7 may be performed by a network entity or network node in a communications system, such as LTE or 5G NR. In some example embodiments, the network entity performing the method of FIG. 7 may include or be included in a base station, access node, node B, eNB, gNB, NG-RAN node, transmission-reception points (TRPs), high altitude platform stations (HAPS), relay station or the like. In one embodiment, the network node performing the method of FIG. 7 may include an anchor network node, anchor gNB, or anchor cell, such as one or more of the anchor CU-CPs illustrated in the example of FIG. 4A, FIG. 4B, and FIG. 4C or FIG. 5A, FIG. 5B, and FIG. 5C, or similar radio node. Therefore, the method of FIG. 7 may include one or more operations illustrated in the examples of FIG. 4A, FIG. 4B, and FIG. 4C or FIG. 5A, FIG. 5B, and FIG. 5C.

As illustrated in the example of FIG. 7, the method may include, at 700, storing, at an anchor network node, a user equipment (UE)-specific downlink (DL) small data transmission (SDT) context for a user equipment (UE) in radio resource control (RRC) non-connected state that is initiating a SDT procedure to a same target network node to which it had previously initiated a SDT procedure, and/or allocating one or more UL TEIDs for SDT procedures without anchor relocation. In an embodiment, the stored user equipment (UE)-specific downlink (DL) small data transmission (SDT) context comprises information that was previously received from the target network node. For example, the information included in the stored user equipment (UE)-specific downlink (DL) small data transmission (SDT) context may include at least F1 downlink (DL) tunnel endpoint identifiers (TEIDs) of the user equipment's (UE's) data radio bearer (DRB) associated with the DU at the target network node.

In an embodiment, the method may include, at 705, forwarding any downlink (DL) radio link control (RLC) service data unit (SDU) pending for the user equipment (UE) data radio bearer (DRB) to the target network node, upon receiving uplink (UL) traffic from the target network node via the previously allocated uplink tunnel endpoint identifier (TEID). According to some embodiments, the method may also include, at 710, pro-actively transmitting, to the centralized unit user plane (CU-UP) of the anchor network node, the stored user equipment (UE)-specific downlink (DL) small data transmission (SDT) context corresponding to at least one DU of at least one target node. According to an embodiment, the method may include transmitting or sending an indication of whether the target network node is allowed to store and use the user equipment (UE)-specific uplink (UL) small data transmission (SDT) context. In one embodiment, the method may also include sending an indication of whether the anchor network node CU-UP is allowed to store and use the user equipment (UE)-specific downlink (DL) small data transmission (SDT) context.

FIG. 8A illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), WLAN access point, TRP, IAB node, and/or HAPS, associated with a radio access network, such as a LTE network, 5G or NR. In example embodiments, apparatus 10 may be NG-RAN node, an eNB in LTE, or gNB in 5G. According to one embodiment, apparatus 10 may be or may include a target network node, target gNB, or target cell, for example.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 8A.

As illustrated in the example of FIG. 8A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a NW node or RAN node, such as a base station, access point, Node B, eNB, gNB, WLAN access point, or the like. In one embodiment, apparatus 10 may be a source node, source gNB, source cell, or the like. For example, in some embodiments, apparatus 10 may be configured to perform one or more of the processes depicted in any of the flow charts or signaling diagrams described herein, such as those illustrated in FIGS. 4-7. In some embodiments, as discussed herein, apparatus 10 may be configured to perform a procedure relating to improved signaling of SDT, as described elsewhere herein, for instance.

FIG. 8B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like. It should be noted that one of ordinary skill in the art would understand that apparatus 20 may include components or features not shown in FIG. 8B.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 8B.

As illustrated in the example of FIG. 8B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 or apparatus 30 via a wireless or wired communications link or interface 70 according to any radio access technology, such as NR.

According to some embodiments, processor 22 and memory 24 may be included in or may form a part of processing circuitry/means or control circuitry/means. In addition, in some embodiments, transceiver 28 may be included in or may form a part of transceiving circuitry or transceiving means.

As discussed above, according to some embodiments, apparatus 20 may be a UE, communication node, mobile equipment (ME), mobile station, mobile device, stationary device, IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as that illustrated in FIGS. 4-7. Thus, according to an embodiment, apparatus 20 may be configured to perform a procedure relating to improved signaling of SDT, as discussed elsewhere herein, for instance.

FIG. 8C illustrates an example of an apparatus 30 according to another example embodiment. In an example embodiment, apparatus 30 may be a node or element in a communications network or associated with such a network, such as a satellite, base station, a Node B, an evolved Node B (eNB), 5G Node B or access point, next generation Node B (NG-NB or gNB), and/or WLAN access point, associated with a radio access network, such as a LTE network, 5G or NR. According to one embodiment, apparatus 30 may be or may be included in an anchor network node, anchor gNB, or anchor cell, for example.

In some example embodiments, apparatus 30 may include one or more processors, one or more computer-readable storage medium (for example, memory, storage, or the like), one or more radio access components (for example, a modem, a transceiver, or the like), and/or a user interface. In some example embodiments, apparatus 30 may be configured to operate using one or more radio access technologies, such as GSM, LTE, LTE-A, NR, 5G, WLAN, WiFi, NB-IoT, MulteFire, and/or any other radio access technologies. It should be noted that one of ordinary skill in the art would understand that apparatus 30 may include components or features not shown in FIG. 8C.

As illustrated in the example of FIG. 8C, apparatus 30 may include or be coupled to a processor 32 for processing information and executing instructions or operations. Processor 32 may be any type of general or specific purpose processor. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 32 is shown in FIG. 8C, multiple processors may be utilized according to other example embodiments. For example, it should be understood that, in certain example embodiments, apparatus 30 may include two or more processors that may form a multiprocessor system (e.g., in this case processor 32 may represent a multiprocessor) that may support multiprocessing. In certain example embodiments, the multiprocessor system may be tightly coupled or loosely coupled (e.g., to form a computer cluster).

Processor 32 may perform functions associated with the operation of apparatus 30 including, as some examples, precoding of antenna gain/phase parameters, encoding and decoding of individual bits forming a communication message, formatting of information, and overall control of the apparatus 30, including processes related to management of communication resources.

Apparatus 30 may further include or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 34 can be comprised of any combination of random access memory (RAM), read only memory (ROM), static storage such as a magnetic or optical disk, hard disk drive (HDD), or any other type of non-transitory machine or computer readable media. The instructions stored in memory 34 may include program instructions or computer program code that, when executed by processor 32, enable the apparatus 30 to perform tasks as described herein.

In an example embodiment, apparatus 30 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 32 and/or apparatus 30.

In some example embodiments, apparatus 30 may also include or be coupled to one or more antennas 35 for receiving a downlink signal and for transmitting via an uplink from apparatus 30. Apparatus 30 may further include a transceiver 38 configured to transmit and receive information. The transceiver 38 may also include a radio interface (e.g., a modem) coupled to the antenna 35. The radio interface may correspond to a plurality of radio access technologies including one or more of GSM, LTE, LTE-A, 5G, NR, WLAN, NB-IoT, BT-LE, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 38 may be configured to modulate information on to a carrier waveform for transmission by the antenna(s) 35 and demodulate information received via the antenna(s) 35 for further processing by other elements of apparatus 30. In other example embodiments, transceiver 38 may be capable of transmitting and receiving signals or data directly. Additionally or alternatively, in some example embodiments, apparatus 30 may include an input and/or output device (I/O device). In certain example embodiments, apparatus 30 may further include a user interface, such as a graphical user interface or touchscreen.

In an example embodiment, memory 34 stores software modules that provide functionality when executed by processor 32. The modules may include, for example, an operating system that provides operating system functionality for apparatus 30. The memory may also store one or more functional modules, such as an application or program, to provide additional functionality for apparatus 30. The components of apparatus 30 may be implemented in hardware, or as any suitable combination of hardware and software. According to an example embodiment, apparatus 30 may optionally be configured to communicate with apparatus 10 via a wireless or wired communications link 71 and/or to communicate with apparatus 20 via a wireless or wired communications link 72, according to any radio access technology, such as NR.

According to some example embodiments, processor 32 and memory 34 may be included in or may form a part of processing circuitry or control circuitry. In addition, in some example embodiments, transceiver 38 may be included in or may form a part of transceiving circuitry.

As discussed above, according to some example embodiments, apparatus 30 may be an anchor network node, anchor gNB, or anchor cell, for example. According to certain example embodiments, apparatus 30 may be controlled by memory 34 and processor 32 to perform the functions associated with example embodiments described herein. For instance, in some example embodiments, apparatus 30 may be configured to perform one or more of the processes depicted in any of the diagrams or signaling flow diagrams described herein, such as those illustrated in FIGS. 4-7. According to certain example embodiments, apparatus 30 may be configured to perform a procedure relating to improved signaling of SDT, as described elsewhere herein, for instance.

In some embodiments, an apparatus (e.g., apparatus 10 and/or apparatus 20 and/or apparatus 30) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. For example, as discussed in detail above, certain embodiments provide ways to make the signalling of SDT without anchor relocation leaner by avoiding the need for RLC context fetch by a target gNB at least for "returning UEs". As noted above, in an embodiment, a UE can be returning in the same DU to perform SDT procedures several times if SDT without anchor relocation is used with the aim to avoid core network involvement (i.e., to save path switch signalling between RAN and AMF). Particularly, when applying certain embodiments, the F1 and Xn backhaul signalling can be decreased for returning UEs since the UE-specific RLC context need not be fetched at every SDT procedure initiated in a target DU not belonging to the anchor gNB. This removes the need for signaling of certain messages during SDT procedure. Further, as a result of certain embodiments, the data latency entailed by SDT for returning UEs can be much shorter, as the data flow can happen immediately. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

What is claimed is:

1. A method, comprising:
   storing, at a first network node, a user equipment-specific uplink small data transmission context for a user equipment in a non-connected radio resource control state, wherein the first network node previously had initiated, without anchor relocation from an anchor network node, a small data transmission procedure via the first network node or a second network node, and wherein the stored user equipment-specific uplink small data transmission context comprises user equipment-specific radio link control context for small data transmission, functional split (F1) uplink tunnel endpoint identifiers associated with centralized unit-user plane of the anchor network node of the user equipment's data radio bearer, and user equipment identifier.

2. The method of claim 1, further comprising:
   performing, at the first network node, radio link control processing of the radio link control protocol data units received from the user equipment using the stored user equipment-specific uplink small data transmission context.

3. The method of claim 1, further comprising:
   receiving, at the first network node from an anchor network node, a trigger to discard the user equipment-specific uplink small data transmission context.

4. The method of claim 1, further comprising:
   determining to discard, at the first network node, the stored user equipment-specific uplink small data transmission context based on a timer.

5. The method of claim 1, further comprising:
   after receiving an update of a user equipment identifier from the anchor network node, providing, to the first network node, the updated user equipment identifier corresponding to the stored user equipment-specific uplink small data transmission context.

6. The method of claim 1, further comprising:
   retrieving, by the first network node, relevant information for the stored user equipment-specific uplink small data transmission context from a radio access network database when the first network node is notified of a change.

7. The method of claim 1, further comprising:
   receiving, at the first network node, assistance information from an anchor network node, wherein the assistance information comprises at least one of an indication of whether the first network node is allowed to store the user equipment-specific uplink small data transmission context, an indication of under which conditions the first network node is allowed to use or apply the stored user equipment-specific uplink small data transmission context, or an indication of estimated user equipment mobility.

8. An apparatus, comprising:
   at least one processor; and
   at least one memory comprising computer program code, the at least one memory and computer program code configured, with the at least one processor, to cause the apparatus at least to:
   store a user equipment-specific uplink small data transmission context for a user equipment in a non-connected radio resource control state, wherein the apparatus previously had initiated, without anchor relocation from an anchor network node, a small data transmission procedure via the apparatus or another network node, and wherein the stored user equipment-specific uplink small data transmission context comprises user equipment-specific radio link control context for small data transmission, functional split (F1) uplink tunnel endpoint identifiers associated with centralized unit-user plane of the anchor network node of the user equipment's data radio bearer, and user equipment identifier.

9. The apparatus of claim 8, wherein the at least one memory and computer program code are further configured to, with the at least one processor, cause the apparatus at least to:
   perform radio link control processing of the radio link control protocol data units received from the user equipment using the stored user equipment-specific uplink small data transmission context.

10. The apparatus of claim 8, wherein the at least one memory and computer program code are further configured to, with the at least one processor, cause the apparatus at least to:
    receive, from an anchor network node, a trigger to discard the user equipment-specific uplink small data transmission context.

11. The apparatus of claim 8, wherein the at least one memory and computer program code are further configured to, with the at least one processor, cause the apparatus at least to:
    determine to discard the stored user equipment-specific uplink small data transmission context based on a timer.

12. The apparatus of claim 8, wherein the at least one memory and computer program code are further configured to, with the at least one processor, cause the apparatus at least to:
    update the user equipment identifier corresponding to the stored user equipment-specific uplink small data transmission context after receiving an update of a user equipment identifier from an anchor network node.

13. The apparatus of claim 8, wherein the at least one memory and computer program code are further configured to, with the at least one processor, cause the apparatus at least to:
    retrieve relevant information for the stored user equipment-specific uplink small data transmission context from a radio access network database when the apparatus is notified of a change.

14. The apparatus of claim 8, wherein the at least one memory and computer program code are further configured to, with the at least one processor, cause the apparatus at least to:
    receive assistance information from an anchor network node, wherein the assistance information comprises at least one of an indication of whether the apparatus is allowed to store the user equipment-specific uplink small data transmission context, an indication of under which conditions the apparatus is allowed to use or apply the stored user equipment-specific uplink small data transmission context, or an indication of estimated user equipment mobility.

15. An apparatus, comprising:
at least one processor; and
at least one memory comprising computer program code, the at least one memory and computer program code configured, with the at least one processor, to cause the apparatus at least to:
store a user equipment-specific downlink small data transmission context for a user equipment in non-connected radio resource control state that is initiating small data transmission procedure to a target network node, wherein the stored user equipment-specific downlink small data transmission context comprises information that was previously received from the target network node, and wherein the information that was previously received from the target network node comprises user equipment-specific radio link control context for small data transmission, functional split (F1) downlink tunnel endpoint identifiers associated with distributed unit of the target network node of the user equipment's data radio bearer, and user equipment identifier; and
allocate one or more uplink tunnel endpoint identifiers for small data transmission procedures without anchor relocation.

16. The apparatus of claim 15, wherein the at least one memory and computer program code are further configured to, with the at least one processor, cause the apparatus at least to:
forward any downlink radio link control service data unit pending for the user equipment data radio bearer to the target network node upon receiving uplink traffic from the target network node via the previously allocated uplink tunnel endpoint identifier.

17. The apparatus of claim 15, wherein the at least one memory and computer program code are further configured to, with the at least one processor, cause the apparatus at least to:
send an indication of whether the target network node is allowed to store and use a user equipment-specific uplink small data transmission context.

* * * * *